United States Patent Office

2,733,204
Patented Jan. 31, 1956

2,733,204

TREATMENT OF HEXAVALENT CHROMIUM SOLUTIONS

Raymond L. Costa, Baltimore, Md., assignor, by mesne assignments, to Allied Chemical & Dye Corporation No Drawing. Application September 6, 1950, Serial No. 183,470

6 Claims. (Cl. 210—24)

This invention relates to the separation of metals from solutions by the use of cation exchange resins and has for its primary object the treatment of aqueous solutions containing hexavalent chromium with cation exchange resins of the oxidation-resistant type at a relatively low pH. My invention is particularly concerned with the treatment of industrial solutions containing hexavalent chromium and other metals, such as those solutions employed for chromic acid anodizing of aluminum, chromium plating, copper stripping, brass dips, magnesium pickles, zinc and cadmium conversion films, many descaling, deoxidizing and passivating treatments, and many other metal treatments employed to impart beauty, durability, better paint adherence or improved corrosion resistance. My invention provides for the recovery of such treated solutions for reuse.

When metal salts, such as those of aluminum or copper, accumulate in solutions of hexavalent chromium in the course of normal use, these solutions become useless for the purposes for which they are intended, and, in the treatment of such solutions by the process of this invention, the hexavalent chromium is made available for further use.

Although it has been known for years that various ion exchange materials are capable of replacing metal ions in solution with other metal or hydrogen ions, all previous attempts to reclaim hexavalent chromium solutions by the adsorption of the contaminant metals on an ion exchange material have failed since the hexavalent chromium chemically attacks the ion exchange material, thereby reducing chromium to the trivalent state and destroying the ion exchange material. I have discovered that, by proper choice of an oxidation-resistant ion exchange material and proper control of concentration and pH of hexavalent chromium solutions, these solutions can be regenerated, and contaminant metals removed, with virtually no reduction of hexavalent chromium or destruction of ion exchange material. I have discovered that, by proper choice of an ion exchange material and suitable operating conditions, a contaminated solution of hexavalent chromium can be brought into contact with the ion exchange material in such a way as to recover the valuable constituents in a usable form, whereas previously there had been known no satisfactory method of recovery.

As would be expected the contaminant metal ions removed from hexavalent chromium solutions may be recovered in usable form as sulfates, chlorides, nitrates or other salts of any desired strong acid, by regeneration of the used cation exchange resin with the desired acid.

I have found also that this invention may be used not only to remove all metal cations from a hexavalent chromium solution, leaving a solution of pure chromic acid, but it may be used so as to reduce the cationic metal content of the solution to a predetermined desired concentration. Since the removal of metal ions is by replacement with hydrogen ions, this treatment affords a method for control of pH as well as that of metal ions concentration. By way of illustration, a chromic acid anodizing bath may be maintained at a composition and pH known to produce the most desirable results.

Furthermore, my invention is such that, in most cases where its application is possible, the savings obtained by the purification of the hexavalent chromium solution, with the resultant recovery of otherwise useless material, make the process profitable.

Among the advantages of the invention are the reclaiming of hexavalent chromium solutions rendered unusable by contaminant metal ions, a reduction in the amount of contaminants entering waste disposal systems, the recovery of contaminant metals in the form of usable salts, and the control and maintenance of optimum working conditions in metal treatment baths containing hexavalent chromium. These objects and advantages of the invention are accomplished in relatively simple and inexpensive manner in simple equipment.

My invention advantageously employs what I call oxidation resistant resins. Resins of the general type suitable for the practice of my invention are preferably sulfonated styrene type cation-exchange resins having only —$SO_3H$ exchange groups. Suitable resins may be obtained on the market under the trade names Amberlite IR-120, Permutit Q, and Dowex 50, which resins are sulfonated styrene-divinyl benzenes. These resins are available as bead-like granules, a form desirable for use in the invention. Other similar types of resins may also be used. The resins known as Dowex-50 are also known as sulfonated infusible polymerizates of polyvinyl aryl compounds.

The general reactions which take place when contaminated hexavalent chromium solutions are brought into contact with cation exchange resins are illustrated by the following equations, in which "R" represents an oxidation-resistant cation exchange resin:

(1) $Al_2(Cr_2O_7)_3 + 6HR \rightleftharpoons 2AlR_3 + 6CrO_3 + 3H_2O$
(2) $CuCr_2O_7 + 2HR \rightleftharpoons CuR_2 + 2CrO_3 + H_2O$ While aluminum and copper dichromates are shown above for purpose of illustration, my invention is not limited to these particular compounds. Regeneration of the resin is illustrated by the following equations, in which "A" represents an acid radical such as $Cl^-$ or $SO_4^=$ (3) $AlR_3 + 3HA \rightleftharpoons AlA_3 + 3HR$
(4) $CuR_2 + 2HA \rightleftharpoons CuA_2 + 2HR$ In this general manner the metal ion held by the resin is released, and the hydrogen ion of the acid is taken into the resin, restoring the resin to its original condition. The salts of the contaminant metals may be recovered from this acid solution, or this solution may be processed for its metal content by methods known to the art; for instance, copper may be removed by electroplating.

For the proper functioning of the ion exchange resin, I have found that it is necessary that the hydrogen ion concentration of the solution to be treated does not exceed certain limits; if the hydrogen ion concentration is too high, chemical reactions as shown in Equations 3 and 4 predominate over those shown in Equations 1 and 2 and little or no metal ion is retained on the resin. This limiting concentration was found to be near a pH of zero, with the aforementioned resins. This pH corresponds to a solution of pure chromic acid having a concentration of about 150 grams $CrO_3$ per liter. It was also found that, to minimize the chemical attack of chromic acid on this resin, the concentration of chromic acid must be limited to about 150 grams per liter; at higher concentrations, there is some reduction of hexavalent chromium to trivalent chromium, with a corresponding destruction of resin, the extent of this attack increasing as the chromic acid concentration increases beyond about 150 grams per liter. Stronger solutions require dilution for satisfactory results with presently known ion exchange resins.

One practical adaptation of the invention is to stir the resin into the solution to be treated and then to remove and regenerate the resin in any suitable manner. The resin may be placed in a confining vessel and the solution run through the resin mass at a rate which provides the desired degree of metal removal. This causes a corresponding increase in hydrogen ion concentration, namely a decrease in pH. When the exchange resin no longer adsorbs metal ions at a satisfactory rate, it is regenerated by running through the resin mass a dilute solution of a highly ionized acid such as sulfuric. Since the exchange resin may be regenerated indefinitely by means of inexpensive mineral acids, the cost of treatment is insignificant compared with the values recovered.

The method of my process is embodied in, but not limited by, the following examples, the data for which are based on a series of experiments in which typical chromic acid solutions were purified by treatment with an oxidation-resistant cation exchange resin. During these trials the exchange resin was used and regenerated 100 times without detectable loss of effectiveness.

EXAMPLE I.—ANODIC BATH

Aluminum and its alloys are anodized in chromic acid baths to form an adherent oxide film on the metal, in which process some aluminum enters the chromic acid solution. This addition of aluminum to the solution raises in pH. When the pH increases beyond certain limits, the quality of the anodic film is impaired. By removing the accumulated aluminum from the solution, the pH is lowered and the solution may be used again. In a specific example, the pH of a spent anodic bath was 0.65, and its composition as follows:

|  | Grams per liter |
|---|---|
| $CrO_3$ | 72.6 |
| $Al_2O_3$ | 7.74 |
| $Cr_2O_3$ | 0.9 |
| $CuO$ | 0.19 |
| $MnO$ | 0.006 |

The ion exchange resin was placed in a glass cylinder so that the spent chromic acid solution could be passed downward through it. In each successive run, the spent solution was passed through the resin, following which the resin was rinsed with water, regenerated with dilute sulfuric acid, rinsed with water until free of acid, and backwashed to re-expand the resin to its original volume. The unit contained 0.04 cubic foot of resin, and was used to treat one gallon of spent chromic acid anodic solution during each cycle, at a flow rate of 1.58 gallons per hour. After passing the chromic acid solution through the resin, the resin was washed with water, the wash being added to the treated chromic acid solution until the specific gravity of the wash was less than 1.007. The average pH of the treated anodic bath was 0.34; its average composition was:

|  | Grams per liter |
|---|---|
| $CrO_3$ | 69.4 |
| $Al_2O_3$ | 1.52 |
| $Cr_2O_3$ | 0.3 |
| $CuO$ | 0.04 |
| $MnO$ | 0.001 |

During a typical run of spent anodic bath through the ion exchange resin, the treated effluent was divided into small portions and analyzed for alumina. The following table shows that any desired degree of purification of the chromic acid solution may be attained by regulating the amount of solution treated per cycle. At the start of the operation the resin body was filled with water and after 3785 ml. (1 gallon) of solution was run, water was run in to rinse the resin, thus accounting for the low concentration at the beginning and end of the run. With the process set up so that there is a flow of spent chromic acid solution through a given quantity of ion exchange resin, the point at which the resin is completely saturated with metal ions may be determined by noting that at this point the pH of the untreated solution and the treated effluent is the same. This is due to the fact that as long as the resin is adsorbing metal ions, and replacing them with hydrogen ions, the pH of the effluent is lowered.

*Table*

| Effluent, Ml. | $CrO_3$, g./l. | $Al_2O_3$, g./l. | $Cr_2O_3$, g./l. | pH |
|---|---|---|---|---|
|  | Influent ||||
|  | 73.0 | 7.90 | 0.8 | 0.62 |
|  | Effluent ||||
| 100 | 34.1 |  |  | 0.71 |
| 500 | 71.3 | 0 | 0.2 | 0.31 |
| 1,000 | 71.9 | 0 | 0.2 | 0.28 |
| 1,600 | 71.9 | 0 | 0.2 | 0.28 |
| 2,000 | 72.1 | 0 |  | 0.28 |
| 2,400 | 72.1 | 1.50 |  | 0.30 |
| 2,800 | 72.3 | 4.72 | 0.6 | 0.41 |
| 3,200 | 72.3 | 6.25 |  | 0.52 |
| 3,500 | 72.3 | 7.21 |  | 0.59 |
| 3,800 | 47.4 |  |  | 0.73 |
| 3,900 | 12.8 |  |  | 1.07 |

EXAMPLE II.—CHROMIUM PLATING SOLUTION

In chromium plating, various metals are cathodically coated with chromium metal from a chomic acid solution. In normal operation, little of the base metal enters the solution, but in cases where some of the base metal is dissolved, the plating solution may be rendered useless or inferior for further plating. After dilution, the contaminant metals are removed from the solution according to the described process, and this purified, but dilute, solution added to the plating bath to make up evaporative losses. In a specific example, a contaminated chromic acid plating solution after dilution contained 100 grams $CrO_3$, 7.2 grams $Fe_2O_3$, and 6.3 grams $CuO$ per liter. This diluted solution was treated in a manner similar to that described in Example I, with satisfactory removal of both iron and copper. The amount of resin used per gallon of diluted solution was 0.067 cubic foot.

EXAMPLE III.—COPPER STRIPPING SOLUTION

Copper stripping solutions are used to remove protective coatings of copper from steel by an anodic treatment in a chromic acid solution. The removed copper accumulates in the solution, raising its pH. When the copper content or the pH of the solution increases beyond certain limits the solution does not function properly. By removal of the copper according to my herein described process, the solution is returned to its original useful condition. The copper may be recovered from the regenerative acid solution. By way of a specific example, a spent copper stripping bath containing 200 grams $CrO_3$ and 50 grams $CuO$ per liter was purified by diluting it with an equal volume of water and passing it through the resin in a manner similar to that described in Example I. All of the copper was removed. The limiting capacity of the resin was found to be 10 gallons of the diluted solution per cubic foot.

If it is desired to maintain the copper concentration at a comparatively low level, such as 2.5 grams $CuO$ per liter, this also may be accomplished. By way of example, on treating a solution containing 100 grams $CrO_3$ and 2.5 grams $CuO$ per liter, all of the copper was removed from 42 gallons of solution per cubic foot of resin. A lesser degree of purification may be obtained by treatment of a larger volume per cycle, the limiting condition being the point at which the resin is saturated with metal ions.

I claim:

1. A process for reclaiming aqueous solutions of hexavalent chromium contaminated with metal cations, comprising bringing said solutions into reacting contact with a cation exchange resin consisting of a sulfonated infusible polymerizate of a polyvinyl aryl compound at a pH of less than 4 but not below 0 to displace the hydrogen of the resin with the metal cations, and separating the hexavalent chromium solution from said resin in which are held the contaminant metal cations, thus reclaiming purified hexavalent chromium solutions.

2. In the method of claim 1, regenerating the resin for reuse by displacing the metal cations with hydrogen ions.

3. A process for the treatment of aqueous solutions from anodizing aluminum, chromium plating, and copper stripping consisting of hexavalent chromium contaminated with metal cations of the group consisting of copper and aluminum comprising bringing the solution into reacting contact with an oxidation-resistant cation exchange resin consisting of a sulfonated infusible polymerizate of a polyvinyl aryl compound at a pH of less than 4 but not below 0 to displace the hydrogen of the resin with the metal cations, and regenerating the resin for reuse by displacing the metal cations with hydrogen ions.

4. A process for the treatment of aqueous solutions containing hexavalent chromium and ions of at least one other metal comprising bringing a solution containing from 20 to 200 grams of chromic acid per liter into reacting contact with a cation exchange resin consisting of a sulfonated infusible polymerizate of a polyvinyl aryl compound operating on the hydrogen ion cycle until there is no longer a substantial reduction in the pH of the solution, the pH of the solution during the reaction being below 4 but not below 0, washing the resin with water, regenerating the resin by means of a dilute solution of a strong acid, washing the regenerated resin with water, and repeating the cycle, thus reclaiming the chromic acid solution for further use.

5. In the process of claim 4, treating a chromic acid solution used for anodizing containing dissolved aluminum.

6. In the process of claim 4, carrying out the operation with a chromic acid solution containing in solution a copper salt.

References Cited in the file of this patent

UNITED STATES PATENTS

| | | |
|---|---|---|
| 2,198,380 | Ellis | Apr. 23, 1940 |
| 2,366,007 | D'Alelio | Dec. 26, 1944 |
| 2,373,547 | D'Alelio | Apr. 10, 1945 |

OTHER REFERENCES

Special volume, "The Electrochemical Society" entitled "Modern Electroplating," published by the Society, Inc., 1952 (page 125 relied upon).

Journal American Chemical Society, vol. 69, November 1947, pp. 2830–36.